US 8,112,424 B2

(12) United States Patent
Hurst et al.

(10) Patent No.: US 8,112,424 B2
(45) Date of Patent: Feb. 7, 2012

(54) FLEXIBLE AND RESILIENT INFORMATION COLLABORATION MANAGEMENT INFRASTRUCTURE

(75) Inventors: Lawrence A. Hurst, Austin, TX (US); Guan-Hua Kong, San Jose, CA (US); Sanjeev Kudesia, Alpharetta, GA (US); Claude N. Warren, Jr., Tryon, NC (US)

(73) Assignee: International Business Machines Corporation, Armonk, NY (US)

(*) Notice: Subject to any disclaimer, the term of this patent is extended or adjusted under 35 U.S.C. 154(b) by 409 days.

(21) Appl. No.: 12/045,738

(22) Filed: Mar. 11, 2008

(65) Prior Publication Data

US 2009/0234883 A1 Sep. 17, 2009

(51) Int. Cl.
*G06F 7/00* (2006.01)
*G06F 17/30* (2006.01)
*G06F 13/14* (2006.01)

(52) U.S. Cl. ......... 707/740; 707/705; 707/736; 707/737
(58) Field of Classification Search ................ 707/706, 707/999.103, 999.205, 705, 736, 737, 740, 707/999.1
See application file for complete search history.

(56) References Cited

U.S. PATENT DOCUMENTS

| 6,701,314 | B1* | 3/2004 | Conover et al. | 707/740 |
|---|---|---|---|---|
| 7,266,553 | B1* | 9/2007 | Anderson et al. | 1/1 |
| 2001/0034734 | A1* | 10/2001 | Whitley et al. | 707/104.1 |
| 2005/0160059 | A1* | 7/2005 | Garrity et al. | 707/1 |
| 2007/0112727 | A1* | 5/2007 | Jardine et al. | 707/3 |

OTHER PUBLICATIONS

Smith et al., "LSID best practices—A guide to deploying Life Science Identifiers", IBM, Apr. 5, 2005, pp. 1-9.
Szekely, "Build a life sciences collaboration network with LSID", IBM, Aug. 15, 2003, pp. 1-11.
Graciano, "Integrate unstructured content into a distributed federated system, Part 1: Plan a connector for WebSphere Information Integrator Content Edition", IBM, Dec. 8, 2005, pp. 1-15.
"Resource Description Framework", Wikipedia, retrieved Nov. 27, 2007, pp. 1-7.
"Resource Description Framework (RDF)", W3C Technology and Society domain, Semantic Web Activity, retrieved Nov. 27, 2007, pp. 1-10 www.w3.org/RDF/.
LSID (Life Sciences Identifier) Resolution Project, retrieved Nov. 27, 2007, pp. 1-3. http://lsids.sourceforge.net.

* cited by examiner

*Primary Examiner* — Cam-Y Troung
*Assistant Examiner* — Cecile Vo
(74) *Attorney, Agent, or Firm* — Yee & Associates, P.C.; Steven L. Bennett (57) ABSTRACT

A computer-implemented method, apparatus, and computer usable program code for cross-silo query and data retrieval. A request to access a data object in a trusted database is received, wherein the request includes an enterprise-wide unique identifier of a data object or one or more metadata attribute value pairs. If the request comprises one or more metadata attribute value pairs, one or more enterprise-wide unique identifiers associated with the metadata attribute value pairs are identified. Using the enterprise-wide unique identifiers, metadata about the data object stored in one or more enterprise-level data stores or the trusted database is retrieved. The metadata about the data object is queried to identify related data objects in disparate trusted databases in the enterprise system. The data object and the related data objects are provided to the application.

10 Claims, 4 Drawing Sheets

FLEXIBLE AND RESILIENT INFORMATION COLLABORATION MANAGEMENT INFRASTRUCTURE

BACKGROUND

1. Technical Field

Embodiments of the present invention relate generally to a data integration support infrastructure, and in particular to a computer implemented method, data processing system, and computer program product for utilizing a unique identifier catalog system and a Resource Description Framework (RDF) system to uniquely identify data within an enterprise and query metadata to discover data relationships within the enterprise.

2. Description of the Related Art

Data within large organizations is typically organized vertically in what are commonly called silos. A silo is an information system in an organization comprising one or more repositories which does not directly share data with other related systems in the organization. Each silo assigns and maintains data identifiers that are only guaranteed to be unique within the silo, and perhaps only unique within a specific data store. Data may migrate from one data store to another as new systems within a silo are brought online and old ones retired, or as data ages and moves from active to archived data stores. Each information silo has its own unique process and business rules for data access and retrieval. As a consequence of an information silo not being capable of reciprocal operation with other related management systems in the organization, the ability to access and retrieve data across the enterprise is currently limited.

There are very few tools available which provide access to data across silos. One such tool, Information Integrator for Content (II4C), is a federated system which provides data integration in a content management environment. Information Integrator for Content provides simultaneous and federated search access to structured database records and unstructured content. However, implementation of existing tools such as Information Integrator for Content to access data across silos can also be problematic. These existing tools comprise complex, cumbersome components that are extremely sensitive to modification of backend systems and would require extensive configuration and maintenance of the configuration to function properly. II4C requires nicknames to map between database as well. Federated databases provide some functionality but have problems when the same object or attribute is called by different names (e.g. "fnam" or "firstname" or "givenNAme" all being the same thing).

BRIEF SUMMARY

The illustrative embodiments described herein apply technologies to the problem of cross-silo query and data retrieval. The illustrative embodiments provide a computer-implemented method, apparatus, and computer usable program code for utilizing unique identifier catalog system and a Resource Description Framework system to uniquely identify data within an enterprise and query metadata to discover data relationships within the enterprise. In one embodiment, a request to access a data object in a trusted database is received from an application, wherein the request includes an enterprise-wide unique identifier of a data object or one or more metadata attribute value pairs. If the request comprises one or more metadata attribute value pairs, one or more enterprise-wide unique identifiers associated with the metadata attribute value pairs are identified. Using the enterprise-wide unique identifiers, metadata about the data object stored in one or more enterprise-level data stores or the trusted database is retrieved. The metadata about the data object is queried to identify related data objects in disparate trusted databases in the enterprise system. The data object and the related data objects are provided to the application.

BRIEF DESCRIPTION OF THE DRAWINGS

The novel features believed characteristic of the illustrative embodiments are set forth in the appended claims. The illustrative embodiments, themselves, as well as a preferred mode of use, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
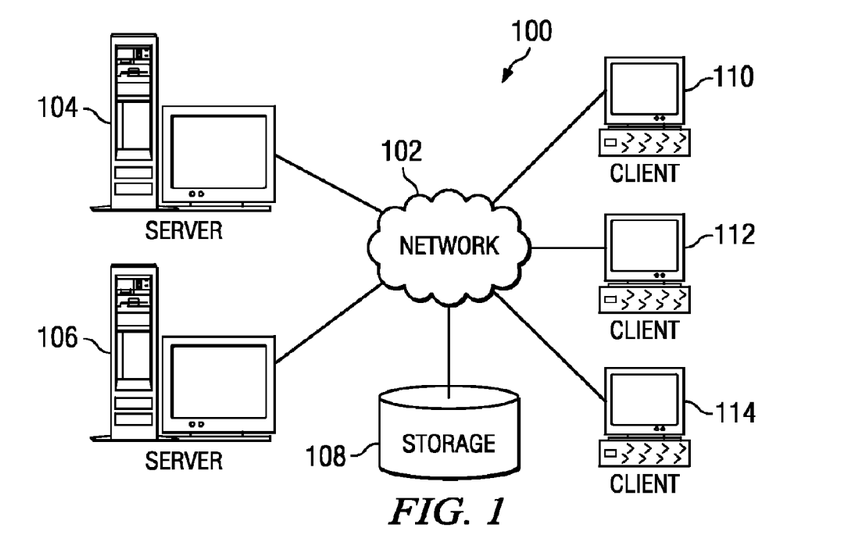
FIG. 1 depicts a pictorial representation of a communications network which an illustrative embodiment of the present invention may be implemented.
Figure 2:
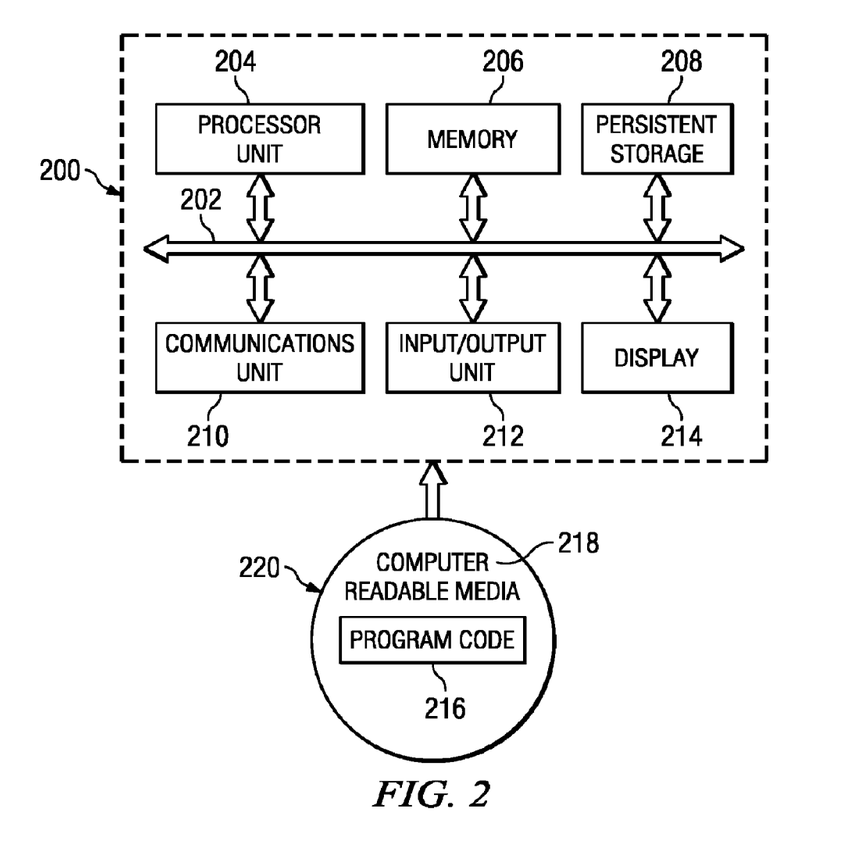
FIG. 2 is a block diagram of a data processing system in which an illustrative embodiment of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a communications network in which illustrative embodiments may be implemented. Communications network 100 is a network of computers in which the illustrative embodiments may be implemented. Communications network 100 contains network 102, which is the medium used to provide communications links between various devices and computers connected together within communications network 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Communications network 100 may include additional servers, clients, and other devices not shown.

In the depicted example, communications network 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments of the present invention provide a computer implemented method, data processing system, and computer program product for utilizing a unique identifier catalog system and a Resource Description Framework (RDF) query system to uniquely identify data within an enterprise and query metadata to discover data relationships within the enterprise. The unique identifier catalog system and the RDF query system are utilized in tandem within each silo to create a cross-silo view of data and metadata, without the fragility and rigidity associated with federated databases. The unique identifier catalog system and the RDF query system are applied to multiple data stores in an enterprise to provide a mechanism that promotes collaboration between silos by associating objects within each silo's data stores together and by providing a simple mechanism to query the disparate data stores.

The catalog system is employed in the illustrative embodiments to provide enterprise-wide unique identifiers for data objects within one or more trusted databases in the enterprise, and RDF information is employed to link or map data objects residing in one database to data objects in other databases. Since a data object in one silo may be named differently than the same data object in another silo, there needs to be a way to reconcile these naming difference across silos, and thereby provide a user with all related objects in the enterprise when the user requests a data object. The RDF information describes linkages between data objects across individual databases (and across silos) using metadata about the data objects and specifies relationships between the data objects. The RDF query system stores the metadata and relationship information in an enterprise-wide metadata store. Implementing an RDF query system on top of a unique identifier-based catalog system within each silo provides access to standard query capabilities. In this manner, when a user queries data objects within a silo, the RDF query system uses the metadata and linking relationships in the enterprise-wide metadata store to provide the user access to associated (but disparate) data objects in other silos.

The unique identifier catalog system comprises identifiers which are location-independent globally unique data resource identifiers. An enterprise-wide unique identifier is used to identify data resources in an enterprise. In contrast with federated systems which employ "nicknames" to correlate data between applications, the illustrative embodiments use globally (enterprise-wide) unique identifiers to ensure that when a system, using the unique identifier, requests data from another system, the system is guaranteed to receive data about the same data object, no matter where the data is located in the enterprise. The enterprise-wide unique identifier is an array of bytes which may be interpreted as a string. In one embodiment, the enterprise-wide unique identifier is a Life Science Identifier (LSID). Life Science Identifier technology provides a naming standard developed by the Life Sciences Research (LSR). An LSID is represented as a Universal Resource Name (URN) comprising the following format:

URN:LSID:<Authority>:<Namespace>:<ObjectID>[:<Version>]

wherein the URN:LSID label specifies the network identifier, <Authority> specifies the issuing authority, <Namespace> specifies the namespace chosen by the issuing authority, <ObjectID> specifies the object identifier unique in the namespace, and <Version> specifies an optional revision identifier to represent versioning information. Life Science Identifier technology provides several basic functionalities, including guaranteed globally unique identifiers across an enterprise. Life Science Identifier technology also provides the ability to retrieve data objects based on LSID, as well as the ability to retrieve metadata about the data objects.

An RDF query system is also implemented in the illustrative embodiments of the present invention to query metadata (data about data) within the enterprise. RDF is a component in the W3C's Semantic Web technologies and provides a framework for describing resources on the Web. The RDF query system receives metadata about data objects within silos or other locations from applications in the enterprise, and stores this metadata in the enterprise-wide metadata store. This data store is made available outside of the individual silos to enable searching and aggregation of the metadata across the silos. The metadata is presented in a consistent manner that allows querying across the silos for similar or related data.

When a data object is stored in a database within a silo, an enterprise-wide unique identifier is created and mapped to the data object. The interface between the mapping system (comprising the enterprise-wide unique identifier and the silo's data object identifier) and the silo itself isolates the mapping system from location changes of the data object within the database, as well as changes in retrieval mechanisms within the database. The enterprise-wide metadata store contains the metadata and the relationships which describes data objects that may or may not be co-located (i.e., objects are located in disparate databases) utilizing the linking capabilities of RDF and the uniqueness of the LSIDs. In other words, the data objects and the metadata about the data objects do not have to be stored in the same location. In fact, the metadata and each of the data objects may all be located in different data stores. The metadata may be queried to locate the same data residing in multiple database locations in the enterprise, as well as to locate related or linked data across silos in the enterprise.

One advantage of the illustrative embodiments of the present invention is that the storage location of the data object is separate and distinct from the storage location of the metadata about the data object. In this manner, the illustrative embodiments allow metadata queries about a data object to occur before retrieval of the actual data object from its storage location is performed. Consequently, the system in the illustrative embodiments is not sensitive to movement in the storage locations of the data objects, since the location of a data object is not determined by the system until after the metadata about the data object is queried. In addition, metadata about a data object may be stored in different metadata locations. The storage locations for metadata about a data object are recorded in a catalog system, and the catalog system may be queried by a metadata manager to determine these storage locations as needed.

Figure 3:
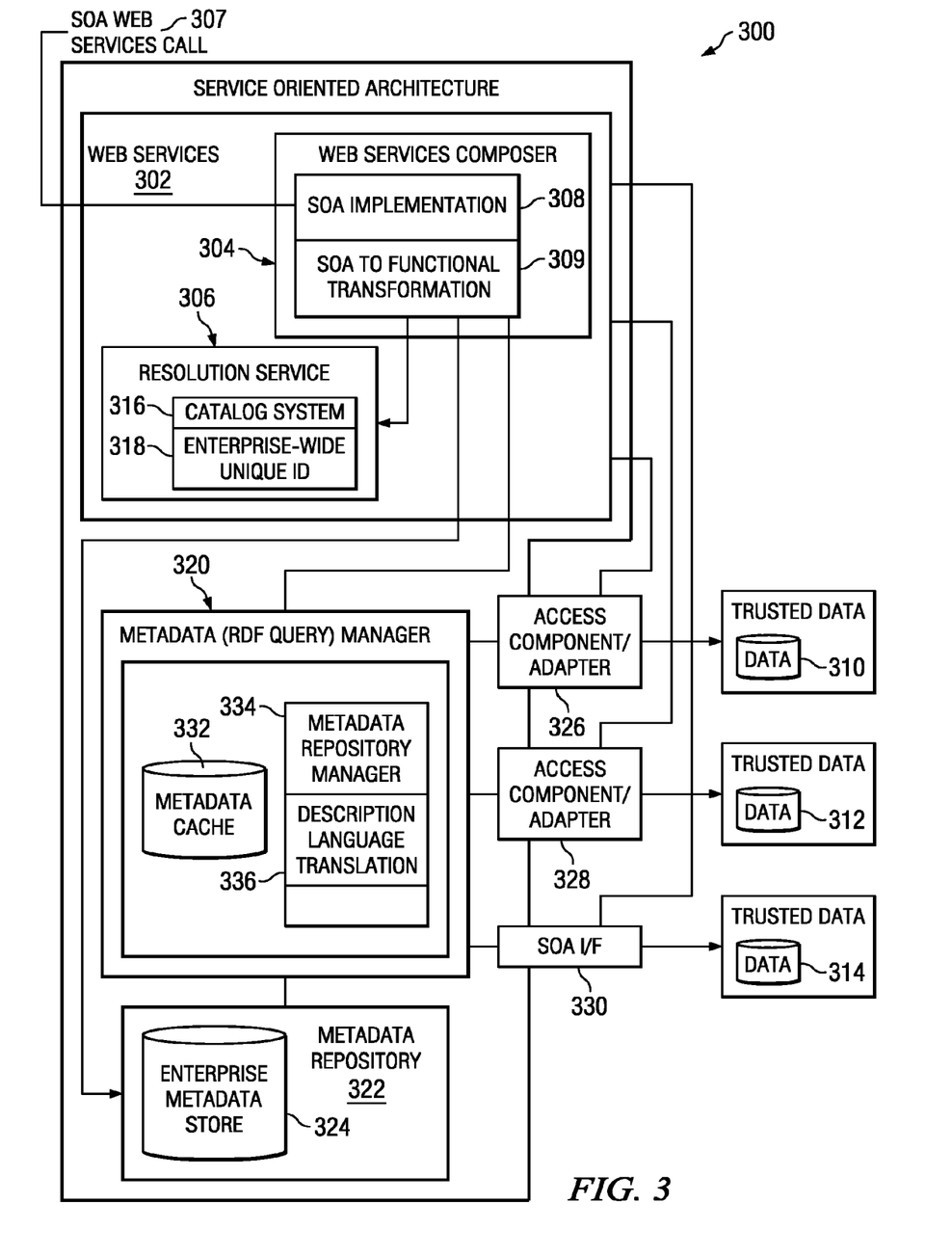
FIG. 3 is a block diagram of an exemplary service oriented architecture (SOA) in which an illustrative embodiment of the present invention may be implemented.

FIG. 3 is a block diagram of an exemplary data processing system in which an illustrative embodiment of the present invention may be implemented. Data processing system 300 in this illustrative example comprises a service oriented architecture (SOA), and specifically a data integration support infrastructure. Data processing system 300 may be implemented as a server, such as server 104 or 106 in FIG. 1.

SOA is a software architecture that is a platform-independent collection of Web services centrally stored which are available to software applications and network end users. Web services, such as Web services 302, are interfaces that describe a collection of operations that are network accessible through standardized extensible markup language (XML) messaging. Web services 302 fulfill a specific task or a set of tasks. Web services 302 are described using a standard format XML notation called its service description, which provides all of the details necessary to interact with the service, including message formats, transport protocols, and location. Web services 302 publish web services that allow a requesting client to store, retrieve, and delete data objects in the data processing system.

Web services 302 within the SOA comprise web services composer 304 and resolution service 306. Web services composer 304 enables users via an SOA Web services call 307 to invoke a service. This service may include a request to access data objects in a trusted database, such as database 310, 312, or 314. Databases 310, 312, and 314 are individual databases that may be organized into different silos in the enterprise. Web services composer 304 may present a user with a list of services registered to data processing system 300 for user selection. Web services composer 304 may execute a selected Web service by entering specific values about the service into input parameters. Web services composer 304 also comprises SOA implementation code 308 and SOA to functional transformation code 309. SOA implementation code 308 is the service layer application code that implements the SOA application services. SOA to functional transformation code 309 is the layer of code that translates SOA Web service calls 307 into the application specific (native) functional calls residing on the data store or application server.

Resolution service 306 provides unique identifier catalog system 316 for identifying data objects in the data processing system. Resolution service 306 assigns an enterprise-wide unique identifier 318 to each data object stored in databases 310, 312, and 314 in the enterprise. When a data object is stored in database 310, 312, or 314, the individual database assigns the data object a database identifier specific to the individual database. However, when the data object is stored in database 310, 312, or 314, resolution service 306 also assigns an enterprise-wide unique identifier to the data object, such as an LSID. While the database identifier specific to the individual database may be unique across the individual database, the enterprise-wide unique identifier or LSID is unique across the enterprise. Thus, each data object stored in one of databases 310, 312, or 314 is assigned an enterprise-wide unique identifier, such that no other data object will be given the same ID.

Once a new enterprise-wide unique identifier is assigned to the data object, resolution service 306 maps the enterprise-wide unique identifier to the database identifier specific to the individual database by creating an entry in a mapping table in the resolution service's own data store. This mapping entry comprises the enterprise-wide unique identifier assigned to the data object, and the database identifier (specific to the individual database) assigned to the data object. Resolution service 306 may then query the trusted database (e.g., 310, 312, or 314) containing the newly stored data object to obtain attributes of the data object. These attributes are stored as metadata about the stored data object in enterprise metadata store 324 in metadata repository 322. In another embodiment, the metadata may be stored within one or more other metadata repositories within the enterprise. The metadata obtained for the data object may include relationship descriptions to other metadata about other data objects, including data objects located in other silos. This other related metadata may also be stored in enterprise metadata store 324, or in other metadata stores in the enterprise. Metadata is related to other metadata if the metadata comprises specific metadata attributes and values contained in the other metadata. The relationship descriptions in the metadata about a data object link the data object to the other data objects in other silos, thereby allowing a user or application to access, through a search of a data object in one silo, other data objects in other silos that are associated with the data object. Resolution service 306 also registers the enterprise-wide unique identifier and database identifier mapping with catalog system 316, as well as recording, in catalog system 316, the metadata stores (e.g., enterprise metadata store 324) holding the metadata for the particular data object. As the metadata stores are registered with catalog system 316, the catalog system may provide, upon request, the particular storage locations of the metadata for the data object.

Metadata query manager 320 is an RDF query system within the SOA. Metadata query manager 320 manages the metadata about data objects stored in databases 310-314. Metadata query manager 320 comprises metadata cache 332, metadata repository manager 334, and description language translation 336. Metadata cache 332 comprises metadata retrieved from databases 310-314 by metadata query manager 320 and other metadata repositories in the enterprise, such as enterprise metadata store 324. Metadata repository manager 334 manages metadata repository 322. To obtain metadata about a data object from trusted databases 310-314, metadata repository manager 334 delegates a retrieval query to description language translation 336. Description language translation 336 translates the retrieval queries into native queries for the targeted trusted data stores 310-314, and the metadata obtained from the queries are stored in metadata cache 332.

When an SOA Web services call 307 for access to a data object in one of databases 310-314 is received at Web services composer 304 from an application, Web services composer 304 uses the database-specific data object identifier in the call to locate the data object in one of database 310-314, and to provide access to the data object via one of access component/adapters 326-330. However, when SOA Web services call 307 is received, Web service composer 304 also provides relevant parameters for the data object to metadata query manager 320. These parameters may include the enterprise-wide unique identifier of the requested data object. In another embodiment, the parameters may comprise metadata attribute value pairs. A metadata attribute value pair comprises an attribute of the data object and the value of that attribute. For example, an attribute of the data object is the "color" of the data object, and the value of that attribute is "orange". In another example, the attribute of the data object is the "line number in an invoice", and the value of that attribute is "5".

When the parameters are receive by metadata query manager 320, metadata query manager 320 instructs resolution service 306 to determine the metadata repositories containing the metadata associated with the data object requested in the call. Using the enterprise-wide unique identifier, resolution service 306 determines the metadata repositories (e.g., enterprise metadata store 324). If only metadata attribute value pairs are passed as the parameters, resolution service 306 may use catalog system 316 to first determine the list of enterprise-wide unique identifiers which contain the attributes specified in the parameters, and then determine the metadata repositories corresponding to the enterprise-wide unique identifiers in the list.

Metadata query manager 320 queries metadata cache 332 to locate metadata associated with the requested data object and related metadata. If metadata cache 332 does not contain the metadata for the requested data object or related metadata, metadata query manager 320 sends a request to enterprise metadata store 324 and/or trusted databases 310-314 to obtain the metadata missing from metadata cache 332. Metadata query manager 320 stores this missing metadata in metadata cache 332.

Metadata query manager 320 creates and processes an RDF query against the data in metadata cache 332. The RDF query locates data objects associated with the metadata (metadata about the requested data object and related metadata about other data objects) stored in metadata cache 332. These located data objects may be data objects in other silos that are associated with the requested data object based on the relationship links in the metadata in metadata cache 332. The RDF query generates a query result set in a three fielded tuple (so-called "triples") format. A tuple in the RDF result set may be represented in a tuple of the form (subject, predicate, object). The tuple may comprise an identifier (e.g., enterprise-wide unique ID) for each data object in the result set. Description language translation 336 translates the RDF tuple into an application specific (native) format, and sends the translated result set comprising a list of data objects related to the requested data object to the calling application.

In this manner, data objects having specific metadata attributes and values related to a requested data object may be located across an enterprise. A request for a data object may span silos by providing a user access to data objects identified as related to the requested data object, regardless of the other data objects' locations in the enterprise.

Figure 4:
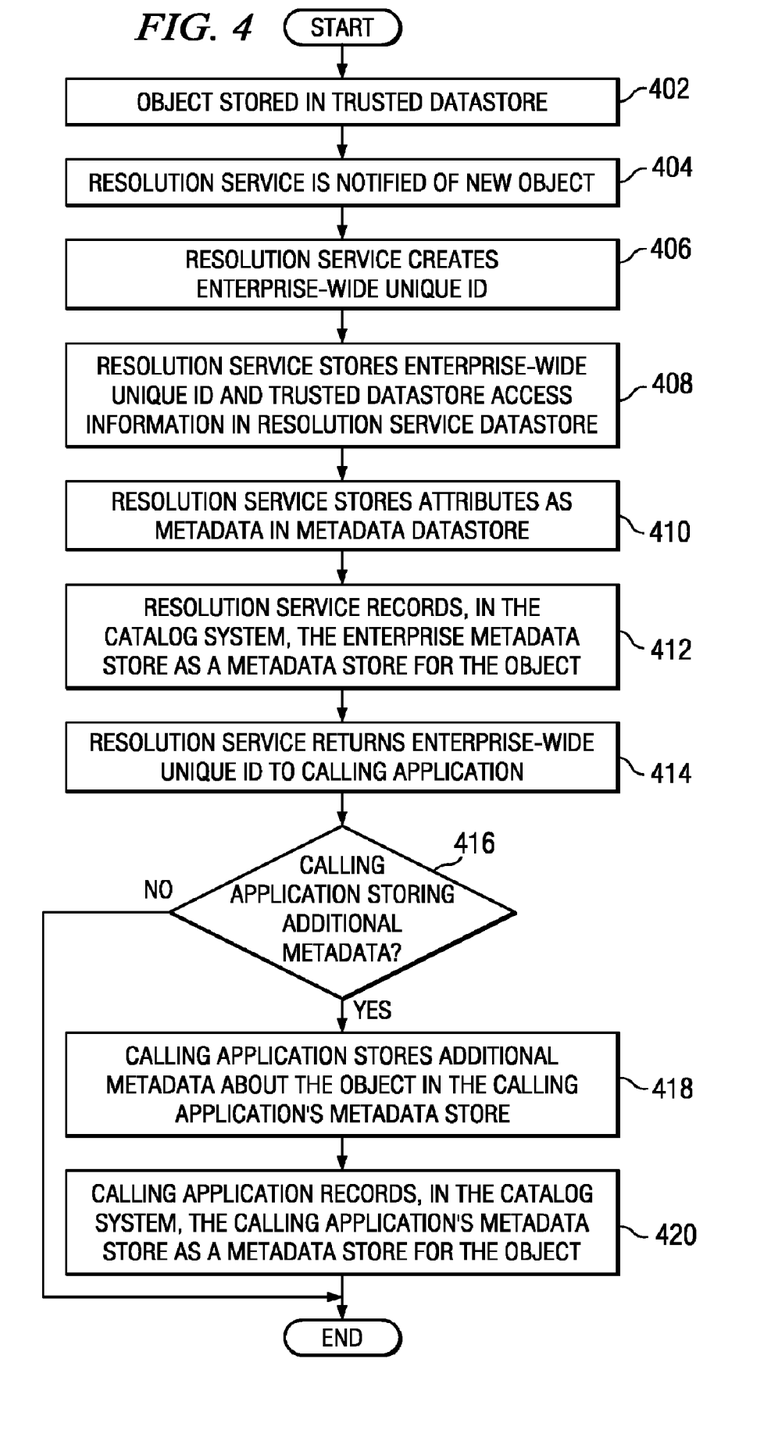
FIG. 4 is a flowchart of a process for creating an enterprise-wide unique identifier for a data object and associating metadata about the data object in accordance with an illustrative embodiment of the present invention.

FIG. 4 is a flowchart of a process for creating an enterprise-wide unique identifier for a data object and associating metadata about the data object in accordance with an illustrative embodiment of the present invention. The process begins when a data object is stored in a trusted datastore (process block 402), such as database 310, 312, or 314 in FIG. 3. A resolution service, such as resolution service 306 in FIG. 3, is notified of the new data object (process block 404). This notification includes the identifier (specific to the individual database) assigned to the data object by the trusted database in which the data object has been stored. This notification may be sent by a calling application which stored the new data object in the trusted database.

Upon receiving the notification, the resolution service creates an enterprise-wide unique identifier (UID) for the new data object (process block 406). The resolution service stores this enterprise-wide unique identifier and the datastore access information (i.e., the database specific identifier received in the notification) in the resolution service's own datastore (i.e., catalog system) (process block 408).

The resolution service stores attributes of the data object as metadata in an enterprise-wide metadata store, such as enterprise-level metadata store 324 in FIG. 3 (process block 410). This metadata may comprise standard metadata, such as a size of the data object, a type of the data object, or the date the data object was created, among others. The minimum set of data attributes stored is based upon the particular implementation used. The resolution service also records, the catalog system, the enterprise-level metadata store as being a metadata store which contains metadata for the new data object in the catalog system (process block 412).

At process block 414, the resolution service returns the enterprise-wide unique identifier to the calling application which stored the new data object in the trusted database. A determination is then made by the calling application whether to store additional metadata (process block 416). Additional metadata comprises application-specific metadata attributes that may optionally be stored by the application, such as, for example, the color of the data objects or the line item number on the invoice. This additional metadata is in addition to the standard metadata about the data object stored in the enterprise metadata stores. If the calling application is not storing additional metadata, the process terminates thereafter. However, if the calling application is storing additional metadata, the calling application stores the additional metadata comprising the enterprise-wide unique ID about the new data object in the calling application's own metadata store (process block 418). The calling application then records, in the catalog system, the calling application's own metadata store as being a metadata store which contains metadata for the new data object (process block 420). In an alternative embodiment, the calling application may store the additional metadata in an enterprise metadata store, such as enterprise metadata store 324 in FIG. 3, if the calling application has permission from metadata repository 322 to do so. In this case, the calling application would record enterprise metadata store 324 as a metadata store which contains metadata for the data object.

Figure 5:
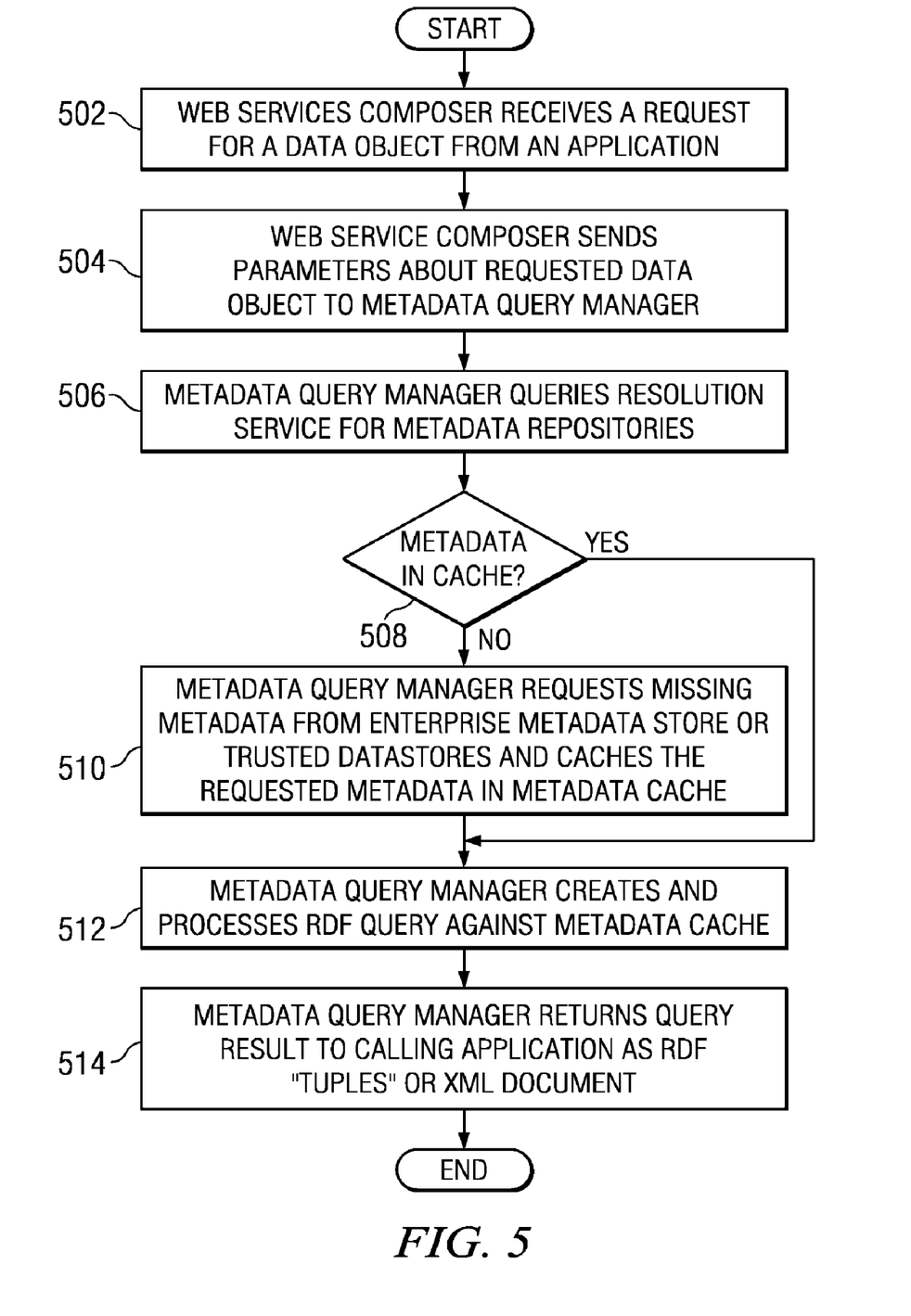
FIG. 5 is a flowchart of a process for utilizing enterprise-wide unique identifiers and an RDF system to uniquely identify data within an enterprise and query metadata to discover data relationships within the enterprise in accordance with an illustrative embodiment of the present invention.

FIG. 5 is a flowchart of a process for utilizing enterprise-wide unique identifiers and a RDF system to uniquely identify data within an enterprise and query metadata to discover data relationships within the enterprise in accordance with an illustrative embodiment of the present invention. The process begins when the Web services composer receives a request for a data object from an application (process block 502). The Web service composer then sends the necessary parameters (e.g., enterprise-wide unique identifier or metadata attribute value pairs) about the requested data object to metadata query manager to enable the metadata query manager to locate data objects associated with the requested data object (process block 504).

The metadata query manager queries the resolution service to determine the metadata repositories that contain the metadata associated with the data object using the enterprise-wide unique identifier or the metadata attribute value pairs (process block 506). Once the metadata query manager receives the metadata repository information from the resolution service, the metadata query manager checks the metadata cache to determine if the desired metadata (metadata about the requested data object and related metadata) is already present in the cache (process block 508). If so, the process continues to process block 512. If the desired metadata is not present in the cache, the metadata query manager requests the metadata about the requested data object from either the enterprise metadata store or the trusted databases and stores this missing metadata in the metadata cache by enterprise-wide unique identifier (process block 510). The relationship links in the metadata about the data object are used to identify other metadata associated with the metadata about the requested object, and this related metadata is also stored in the cache.

At process block 512, the metadata query manager creates and processes an RDF query against the metadata in the metadata cache. The metadata query manager then provides the result set of the RDF query as RDF tuples or an XML document (process block 514). This result set may comprise metadata about the requested data object, metadata about data objected related to the requested data object, a list of data objects related to the requested data object, the data objects related to the requested data object, or any combination of these items.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for locating data across a plurality of disparate databases in an enterprise system, the computer implemented method comprising:
   receiving, at a catalog system data store, a request to access a data object stored in a trusted database in the plurality of disparate databases from an application, wherein said request comprises at least one of an enterprise-wide unique identifier of said data object and one or more metadata attribute value pairs, wherein a metadata attribute value pair comprises an attribute of the data object and a value of the attribute, wherein the catalog system data store is physically separate from the plurality of in response to a determination that said request does not comprise said enterprise-wide unique identifier of said data object;
   computer usable program code for using the enterprise-wide unique identifiers to retrieve metadata about said data object from the metadata store;
   computer usable program code for querying the metadata about said data objects to identify related data objects in the plurality of disparate databases in the enterprise system using a Resource Description Framework query; and
   computer usable program code for providing said application with access to the data object and the related data objects;
   computer usable program code for associating the enterprise-wide unique identifier with a data identifier of the data object using a catalog system, and wherein the computer usable program code for associating the enterprise-wide unique identifier with the database identifier of the data object using the catalog system comprises:
   computer usable program code for creating the enterprise-wide unique identifier for the data object in response to said data object being stored in a trusted database and being assigned a database identifier specific to the trusted database, wherein the enterprise-wide unique identifier is location-independent and globally unique to the data object;
   computer usable program code for mapping the enterprise-wide unique identifier to the database identifier of the data object; and
   computer usable program code for registering the enterprise-wide unique identifier and the database identifier in the catalog system; and
disparate databases, and wherein the enterprise-wide unique identifier is a Life Sciences Identifier;
   identifying said enterprise-wide unique identifier of said data object by searching a metadata store physically separate from the plurality of disparate databases utilizing said one or more metadata attribute value pairs in response to a determination that said request does not comprise said enterprise-wide unique identifier of said data object;
   using the enterprise-wide unique identifier to retrieve metadata about said data object from the metadata store;
   querying the metadata about said data object to identify related data objects in the plurality of disparate databases in the enterprise system using a Resource Description Framework query; and
   providing said application with access to the data object and the related data objects;
   associating the enterprise-wide unique identifier with a database identifier of the data object using a catalog system, wherein associating the enterprise-wide unique identifier with the database identifier of the data object using the catalog system comprises:
     responsive to the data object being stored in said trusted database and being assigned a database identifier specific to the trusted database, creating the enterprise-wide unique identifier for the data object, wherein the enterprise-wide unique identifier is location-independent and globally unique to the data object;
     mapping the enterprise-wide unique identifier to the database identifier of the data object; and
     registering the enterprise-wide unique identifier and the database identifier in the catalog system; and
   responsive to creating the enterprise-wide unique identifier for the data object, generating the metadata about the data object and storing the metadata about said data object in the metadata store, wherein storing the metadata about said data object in the metadata store comprises:
     accessing said metadata about the data object from within the trusted database using the database identifier;
     accessing metadata about a related data object in another trusted data store using a relationship link in the metadata about the data object; and
     storing the metadata about the data object and the metadata about the related data objects in the metadata store.

2. The computer implemented method of claim 1, wherein the metadata store storing the metadata about the data object is external to a storage location of the data object and wherein the step of querying the metadata about said data object is performed before retrieval of the data object from the storage location.

3. The computer implemented method of claim 1, wherein additional metadata about a data object stored in the metadata store comprises application-specific metadata received from the application.

4. The computer implemented method of claim 1, wherein the metadata store includes one or more enterprise-level data stores or the trusted database.

5. A data processing system for locating data across disparate databases in an enterprise system, the data processing system comprising:
   a bus;

a storage memory connected to the bus, wherein the storage memory contains computer usable code;
at least one managed device connected to the bus;
a communications unit connected to the bus; and
a processing unit connected to the bus, wherein the processing unit executes the computer usable code to:
receive, at a catalog system data store, a request to access a data object stored in a trusted database in the plurality of disparate databases from an application, wherein said request comprises at least one of an enterprise-wide unique identifier of said data object and one or more metadata attribute value pairs, wherein a metadata attribute value pair comprises an attribute of the data object and a value of the attribute, wherein the catalog system data store is physically separate from the plurality of disparate databases, and wherein the enterprise-wide unique identifier is a Life Sciences Identifier;
identify said enterprise-wide unique identifier of said data object by searching a metadata store physically separate from the plurality of disparate databases utilizing said one or more metadata attribute value pairs in response to a determination that said request does not comprise said enterprise-wide unique identifier of said data object;
use the enterprise-wide unique identifiers to retrieve metadata about said data object from the metadata store;
query the metadata about said data object to identify related data objects in the plurality of disparate databases in the enterprise system using a Resource Description Framework query; and
provide said application with access to the data object and the related data objects;
wherein the processing unit further executes computer usable code to associate the enterprise-wide unique identifier with a database identifier of the data object using a catalog system, and wherein the computer usable code for associating the enterprise-wide unique identifier comprises computer usable code to create the enterprise-wide unique identifier for the data object in response to the data object being stored in said trusted database and being assigned a database identifier specific to the trusted database, wherein the enterprise-wide unique identifier is location-independent and globally unique to the data object; map the enterprise-wide unique identifier to the database identifier of the data object; and register the enterprise-wide unique identifier and the database identifier in the catalog system; and
wherein the processing unit further executes computer usable code to generate the metadata about the data object and store metadata about said data object in the store in response to creating the enterprise-wide unique identifier for the data object,
wherein the computer usable code for storing said metadata comprises computer usable code to access said metadata about the data object from within the trusted database using the database identifier; access metadata about a related data object in another trusted data store using a relationship link in the metadata about the data object; and store the metadata about the data object and the metadata about the related data objects in the metadata store.

6. The data processing system of claim 5, wherein the metadata store storing the metadata about the data object is external to a storage location of the data object and wherein querying the metadata about said data object is performed before retrieval of the data object from the storage location.

7. The data processing system of claim 5, wherein additional metadata about a data object stored in the metadata store comprises application-specific metadata received from the application.

8. A computer program product for locating data across disparate databases in an enterprise system, the computer program product comprising:
a non-transitory computer readable storage medium having computer usable program code tangibly embodied thereon;
computer usable program code for receiving, at a catalog system data store, a request to access a data object stored in a trusted database in the plurality of disparate databases from an application, wherein said request comprises at least one of an enterprise-wide unique identifier of said data object and one or more metadata attribute value pairs, wherein a metadata attribute value pair comprises an attribute of the data object and a value of the attribute, wherein the catalog system data store is physically separate from the plurality of disparate databases, and wherein the enterprise-wide unique identifier is a Life Sciences Identifier;
computer usable program code for identifying said enterprise-wide unique identifier of said data object by searching a metadata store physically separate from the plurality of disparate databases utilizing said one or more metadata attribute value pairs
computer usable program code for generating the metadata about the data object and storing metadata associated with a data object in the metadata store in response to creating the enterprise-wide unique identifier for the data object, wherein the computer usable program code for storing the metadata about said data object in the metadata store comprises:
computer usable program code for accessing said metadata about the data object from within the trusted database using the database identifier;
computer usable program code for accessing metadata about a related data object in another trusted data store using a relationship link in the metadata about the data object; and
computer usable program code for storing the metadata about the data object and the metadata about the related data objects in the metadata store.

9. The computer program product of claim 8, wherein the metadata store storing the metadata about the data object is external to a storage location of the data object wherein querying the metadata about said data object is performed before retrieval of the data object from the storage location.

10. The computer program product of claim 8, wherein additional metadata about a data object stored in the metadata store comprises application-specific metadata received from the application.

* * * * *